United States Patent [19]
Staltmeir et al.

[11] Patent Number: 5,813,499
[45] Date of Patent: Sep. 29, 1998

[54] BRAKE CALIPER UNIT FOR VEHICLE AND ESPECIALLY RAIL VEHICLE DISC BRAKES

[75] Inventors: Josef Staltmeir, Munich; Erich Fuderer, Germering; Oskar Sponfeldner, Mühldorf, all of Germany

[73] Assignee: Knorr-Bremse Systeme fur Schienenfahrzeuge GmbH, Munich, Germany

[21] Appl. No.: 809,201

[22] PCT Filed: Jul. 5, 1995

[86] PCT No.: PCT/DE95/00872

§ 371 Date: Feb. 27, 1997

§ 102(e) Date: Feb. 27, 1997

[87] PCT Pub. No.: WO96/07576

PCT Pub. Date: Mar. 14, 1996

[30] Foreign Application Priority Data

Sep. 2, 1994 [DE] Germany ............ 44 31 353.5

[51] Int. Cl.⁶ ............ F16D 65/16; F16D 65/32
[52] U.S. Cl. ............ 188/59; 188/72.9
[58] Field of Search ............ 188/59, 71.7–71.9, 188/72.2, 72.4, 72.6, 72.7, 72.8, 72.9, 79.55, 153 R, 196; 74/47, 54, 116, 122

[56] References Cited

U.S. PATENT DOCUMENTS

| | | | |
|---|---|---|---|
| 4,374,552 | 2/1983 | Dayen | 188/72.9 |
| 4,473,136 | 9/1984 | Emilsson et al. | 188/72.4 |
| 4,497,392 | 2/1985 | Stensson et al. | 188/72.6 |
| 4,592,451 | 6/1986 | Persson | 188/72.9 |
| 4,607,729 | 8/1986 | Staltmeir et al. | 188/153 R |
| 4,921,076 | 5/1990 | Grenier et al. | 188/72.6 |
| 5,036,956 | 8/1991 | Genier | 188/72.6 |
| 5,501,305 | 3/1996 | Stalmeir et al. | 188/72.7 |

Primary Examiner—Robert J. Oberleitner
Assistant Examiner—Chris Schwartz
Attorney, Agent, or Firm—Barnes & Thornburg

[57] ABSTRACT

The brake caliper unit has two caliper levers whose one ends are linked to brake pads and whose other ends are linked to a slack adjusting device extending between them. The central regions of the caliper levers are coupled to a housing, in which case the coupling point of one caliper lever is constructed as a simple rotary bearing. The coupling point of the other caliper lever is constructed as an eccentric transmission which can be operated by a brake cylinder held in the housing by a crank arm in the direction of the approach of the two caliper levers. The eccentric transmission has a shaft which is rotatable in the housing about an axis and which, with an eccentricity directed diagonally away from the brake disc carries a pin with the axis on which the caliper lever is disposed. The eccentric transmission permits a high power transmission ratio with relatively short caliper levers.

14 Claims, 3 Drawing Sheets

BRAKE CALIPER UNIT FOR VEHICLE AND ESPECIALLY RAIL VEHICLE DISC BRAKES

BACKGROUND AND SUMMARY OF THE INVENTION

The invention relates to a brake caliper unit for disc brakes having a pair of interconnected caliper levers.

In the case of brake caliper units of the concerned type (EP-0132 601 B1, EP-0 499 971 B1), it is customary, for the brake operation, to spread apart the ends of the caliper levers connected in the center by means of a connecting rod optionally constructed as a slack adjusting device by of a brake power unit, particularly a brake cylinder arranged between these ends. It is also known to link the brake cylinder to the central regions of the caliper levers coupled on the end side by an a sleek adjusting device. In this case, it is also known to provide slack adjusting devices integrated in the brake power unit. In all these arrangements, the central linking region of the caliper levers must be situated radially outside the brake disk diameter, and the caliper levers therefore have a considerable length from these linking regions to the linking point of the brake pads. Therefore, for achieving sufficiently large linkage ratios, the calipers levers, as a whole, must be constructed to be very long and therefore, particularly with respect to the required stability, to be very heavy. For avoiding this deficiency, it is known to displace the central linking region of the caliper levers into regions laterally of the brake disk and thereby shorten the caliper lever portion to the brake pad. However, for this purpose, high-expenditure, expensive connection linkages are required for the central caliper lever regions with optionally additional moving joints which were not accepted in practice.

In the case of a disk brake of a different type (DE-30 32 992 A1), it is known to apply the caliper levers by spring force and to release them by a rotary-field magnet which acts by way of an eccentric and has a step-down gear.

It is an object of the invention to develop a brake caliper unit of the initially mentioned type in a simple manner such that, while its space requirement and weight are low, it permits a compact construction and high transmission ratio.

The features of the characterizing part of claim 1 are used for achieving this object.

Advantageous embodiments and further developments of the invention for brake caliper units constructed in this manner are indicated in additional characteristics of the subclaims.

BRIEF DESCRIPTION OF THE DRAWINGS

The drawing illustrates an advantageous embodiment of a, brake caliper unit constructed according to he invention.

DETAILED DESCRIPTION OF THE PREFERRED EMBODIMENTS

Figure 1:
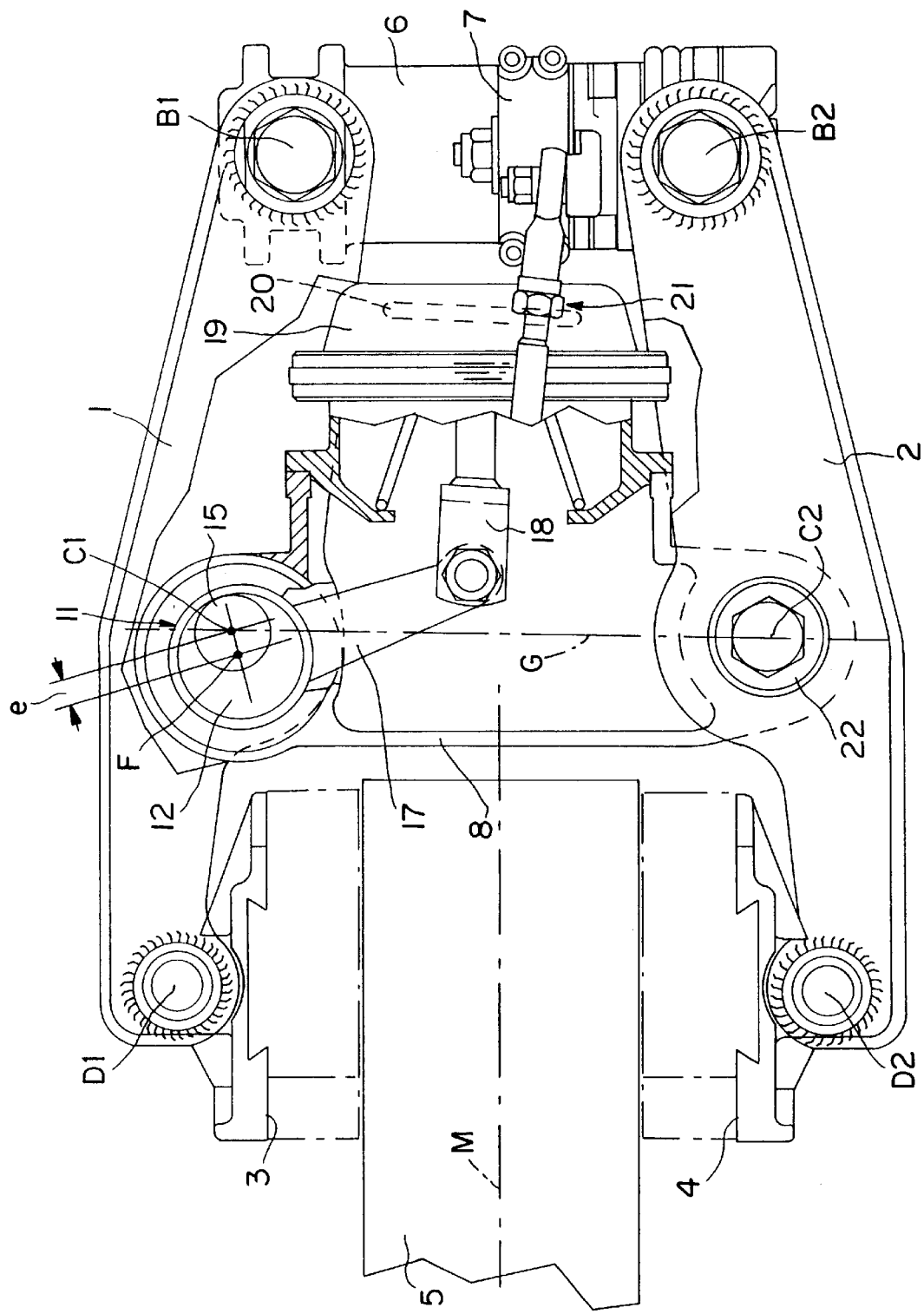
FIG. 1 is a partially cut-open top view.

According to FIG. 1, the brake caliper unit has two caliper levers 1 and 2 which extend horizontally and mutually approximately in parallel and laterally offset. To one of the ends of the caliper levers, two brake pads 3 and 4 are linked which can be swivelled about vertical axes D1 and D2 and which can be pressed against a brake disc 5 which reaches between them. The other ends of the caliper levers 1 and 2 are rotatably about the vertical axes B1 and B2 and linked to the two ends of a slack adjusting device 6 which is constructed as a pressure rod actuator and which can be operated by the swivelling of an operating device 7. As customary, the slack adjusting device 6 may have a spiral gear which is not shown and has a rotatable screwing part which is coupled by free wheeling mechanisms with the operating device 7 or a non-rotatable part; however, it may also be of a different known construction.

Figure 2:
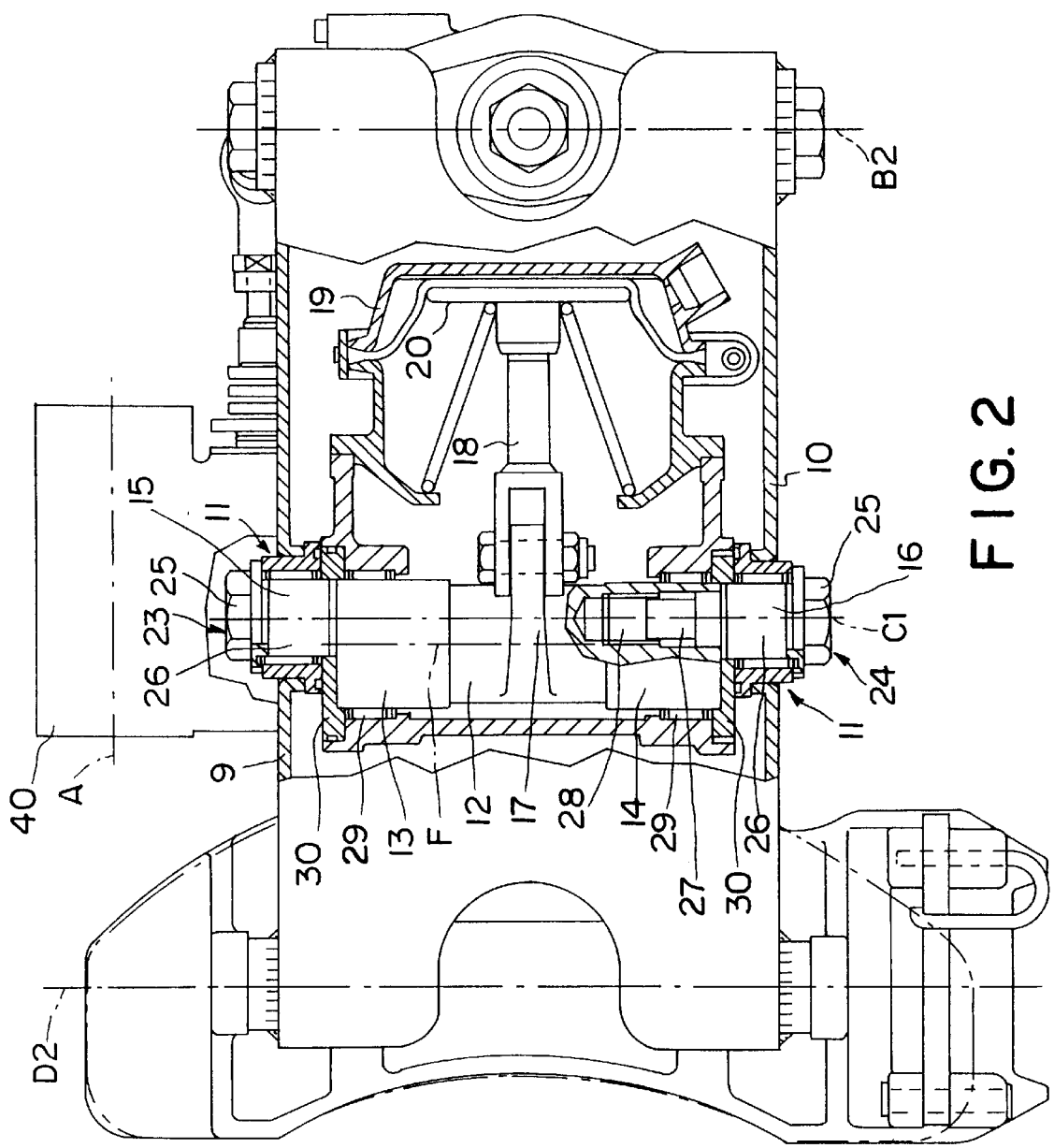
FIG. 2 is a partially cut-open lateral view of the brake caliper unit.

In their central regions, the two caliper levers 1 and 2 have links to a housing 8 which extends essentially between them. The caliper levers 1 and 2 have a double-cheeked construction, as illustrated in FIG. 2, which is a lateral view from the side of the caliper lever which is illustrated to be partially cut away with the two cheeks 9 and 10. The linking of the caliper lever 1 on the housing 8, as illustrated in FIG. 1 and 2, is constructed as an eccentric transmission. For this purpose, a vertical shaft 12 is provided which has an axis F and which, between the two cheeks 9 and 10 and close to them, has two cylindrical sections 13 and 14 by which it is rotatably about the axis F disposed on the housing 8. From both front sides of the cylindrical sections 13 and 14, which face away from one another, cylindrical pins 15 and 16 project eccentrically to the axis F. The axis C1 of these pins 15 and 16 has the eccentricity e with respect to the axis F. With respect to the axis F, it extends essentially diagonally in the direction of the axis B1 and slightly sloped toward the exterior side of the brake caliper unit. The two cheeks 9 and 10 of the caliper lever 1 are rotatably disposed about the axis C1 on the pin 15 and 16 to be described in greater detail later. In the central region of its longitudinal course, the shaft 12 is non-rotatably connected with a crank arm 17 which projects approximately transversely to the longitudinal direction of the caliper levers 1 and 2 toward the caliper center. The end of the crank arm 17 is linked to the piston rod 18 of a brake cylinder 19 with the piston 20 which represents a brake power unit and is arranged facing away from the brake disc with respect to a plane G placed through the axes C1 and C2. This axis of the brake cylinder 19 as well as its piston 20 extends approximately in parallel to the longitudinal direction of the caliper levers 1 and 2.

The operating device 7 is coupled by an operating linkage 21 with a part which moves with the piston rod 18, such that excessively long strokes of the piston rod result in a rotation of the operating device 7 which causes slack adjusting operations. In this case, it is expedient, as customary, for excessive strokes to be recorded which occur only during the stalling stroke. If the excessive stroke exceeds a certain application force threshold, then actual extensions of the slack adjusting device 6 occurs only during the release stroke.

The caliper lever 2 of the other side is linked rotatably about the axis C2 on its two cheeks by means of simple rotary bearings 22 to the housing 8.

In the release condition, the parts of the brake caliper unit take the positions illustrated in FIG. 1 and 2, in which case the brake pads 3 and 4 are lifted by a slight release stroke from the brake disc 5. When, for operating the brake caliper unit, the brake cylinder 19 is acted upon by a pressure medium, according to FIG. 1 and 2, the left displacement of the piston 20 and the piston rod 18 by way of the crank arm 17, cause the shaft 12 to be rotated clockwise according to FIG. 1. In this case, the pins 15 and 16 move on a circular path about the axis F towards the caliper lever 2 relative to the housing 8, whereby the caliper lever 1, while the housing 8 remains in its position, is rotated about the axis B1 until it rests against the brake pad 3 on the brake disc 5. Subsequently, the caliper lever 1 rotates essentially about the axis D1, whereby the axis B1, according to FIG. 1, is displaced in the direction of the axis B2. In the case of this displacement, by way of the slack adjusting device 6, the axis B2 is also moved in the same direction as B1 is moving, whereby the caliper lever 2 is rotated about the axis C2, which retains its position, until the brake pad 4 comes to rest on the brake disc 5. During the subsequent fixed application, during which the brake pads 1 and 2 are pressed with a high force against the brake disc 5, elastic deformations of the parts of the brake caliper unit, particularly of the caliper levers 1 and 2 as well as of the housing 8, are absorbed with corresponding slight rotations possibly of both caliper levers 1 and 2.

During the subsequent releasing of the brake, correspondingly reversed operations take place. It is obvious that the eccentricity e can be designed to be small and therefore the power transmission ratio of the brake caliper unit can be designed to be very large also in the case of an unfavorable lever ratio, that is, lever arm lengths C-D to C-B at the caliper levers 1 and 2.

Figure 3:
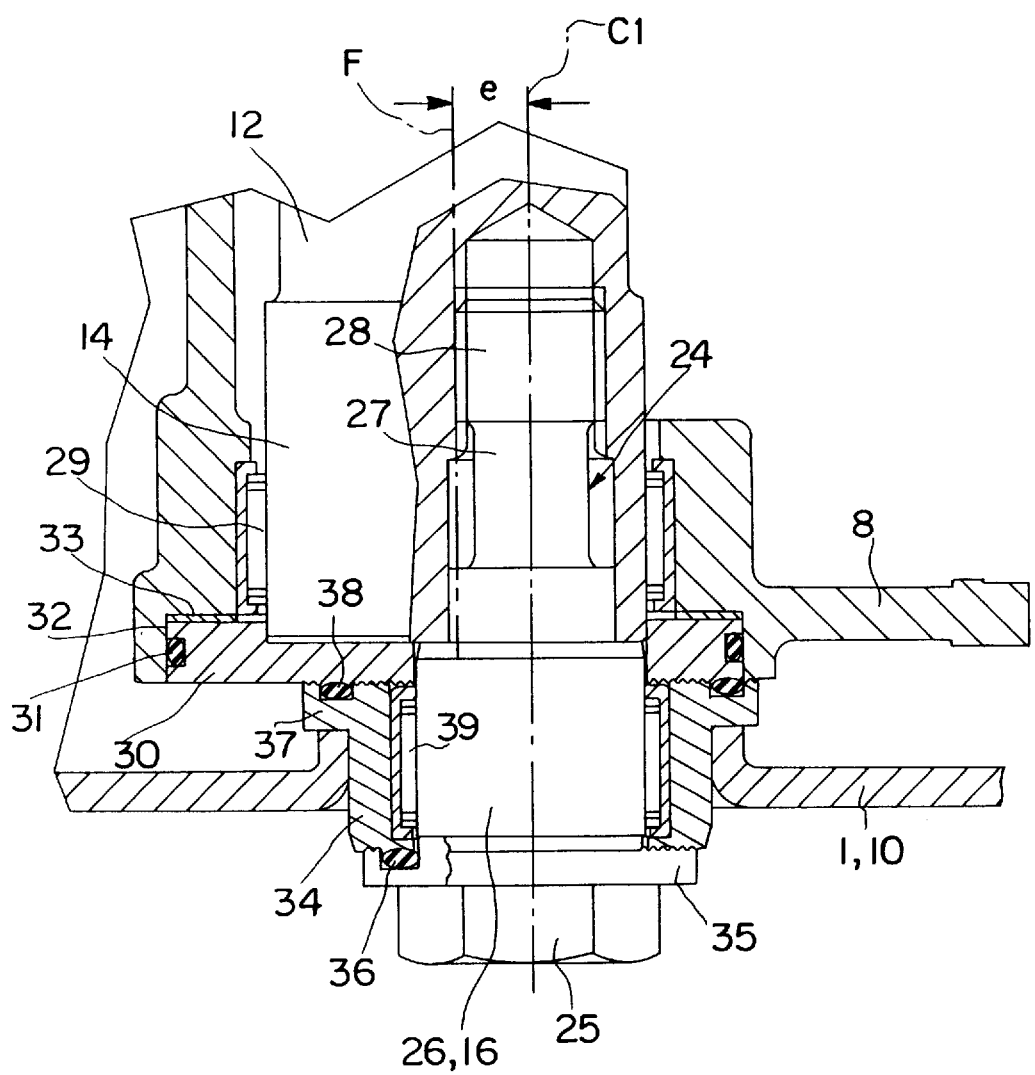
FIG. 3 is an enlarged detail from FIG. 2.

The construction of the eccentric transmission 11 with the pins 15 and 16 is the same on both ends of the shaft 12. FIG. 3 shows this construction for the area of the lower pin 16 in a particularly clear manner.

According to FIGS. 2 and 3, the pins 15 and 16 are formed by cylindrical sections 26 of two expansion screws 23 and 24, the cylindrical sections 26 being situated close to the heads 25 of the expansion screws 23 and 24. The two expansion screws 23 and 24 are screwed from both sides on the front side into the shaft rotatably disposed on the housing 8 by rotary bearings 29. Their expansion section 27 is situated between their screw section 28 and the cylindrical section 26. The rotary bearings 29, which are arranged on the cylindrical sections 13 and 14 of the shaft 12 can be constructed as roller bearings or slide bearings. At the transition of the cylindrical sections 13 and 14 to the section 26, a cover disk 30 is in each case situated which on the front side covers the sections 13 and 14. The cover disk 30 is disposed with its outer circumference, which is concentric to the axis F of the shaft 12, by means of a sealing ring 31 in a sealed manner rotatably on the wall of a correspondingly cylindrical flat recess 32. The cover disk 30 which is non-rotatably connected with the shaft 12 has a larger diameter than the rotary bearing 29 of the shaft 12. An axial bearing 33 is situated between its shaft-side lateral surface and the ring-shaped base surface of the recess 32.

The cheeks 9 and 10 of the caliper levers 1 and 2 are fixedly connected with bearing sleeves 34 which extend coaxially to the axes C1 and C2 and, by rotary bearings 39 constructed as roller bearings or slide bearings, are rotatably disposed on the cylindrical sections 26 of the expansion screws 23 and 24. Ring flanges 35 provided on the heads 25 of the expansion screws 23, 24 rest, in a sealed-off manner by way of sealing rings 36, rotatably against the exterior front sides of the bearing sleeves 34 on the side of the cover disk 30, the bearing sleeves end with ring flanges 37 which by sealing rings 38 rest rotatably on the cover disks 30. The bearing sleeves 34 are therefore supported toward the axis C1, C2, in a manner securing them against jamming, against the cover disks 30. With respect to the brake pads 3, 4, the brake caliper unit can therefore be designed to be free of suspension pendulums, which saves weight, space as well as manufacturing and mounting costs. The forces, which act upon the brake pads 3,4 during a braking in the circumferential direction of the brake disc 5, are transmitted to the housing 8 by the caliper levers 1 and 2 which are particularly stiff in the vertical direction because they have two cheeks, and their bearing sleeves 34, on the one hand, by way of the ring flanges 37 to the cover disks 30 and the axial bearings 33 and, on the other hand, by way of the rotary bearings 39, the expansion screws 23, 24 and the rotary bearings 29, while being protected against a jamming. However, naturally it is also possible to suspend the brake pads 3, 4 or the ends of the caliper levers 1, 2, close to the brake pads in a conventional manner by suspension pendulums, which are not shown. The caliper levers can being constructed on both ends of the shaft 12 vertically in a less bending-resistant manner, for example, as simple levers, and not with double walls, and without any double arrangement of the eccentric transmission and can be disposed on the housing 8 while being less resistant to a jamming.

For achieving a uniform release stroke of the two brake pads 3 and 4, that is, a uniform play distance of the brake pads 3, 4 from the brake disc 5 in the release position of the brake caliper unit, the coupling point of the caliper lever 1 to the slack adjusting device 6 which can be rotated about the shaft B1 can be constructed to be sluggish. The sluggishness can be caused by a frictional engagement between the caliper lever 1 and the actuating device 6 preferably provided in the rotary bearing.

As a modification of the above-described, preferred embodiment, according to the invention, it is also possible to construct the linking of the caliper lever 2 to the housing 8, not as a simple rotary bearing 22 but as an eccentric transmission corresponding to the eccentric transmission 11 and to drive it by the brake cylinder 19 or an additional brake cylinder. In the case of this embodiment, extended stroke paths of the brake pads 3, 4 are possible. Furthermore, it is possible to arrange the one or the two eccentric transmissions on the links of the brake levers to the slack adjusting device and to construct the links to the housing as simple rotary bearings. In which case the eccentric transmissions must be constructed to be spreading apart the caliper lever ends. It is also possible to exchange the coupling points of the housing and the slack adjusting device with respect to the caliper levers. In which case, again, in addition to the above-described embodiments, corresponding different embodiments with one or several eccentric transmissions are possible. In this case, the slack adjusting device is to be constructed as a connecting rod actuating device and the eccentric transmission or transmissions are to be constructed to be spreading apart the caliper lever ends.

In the case of caliper levers 1, 2 which extend horizontally side-by-side, it may be expedient, as illustrated in FIG. 2, to provide the housing 8 on its top side with a bearing lug 40 of a relatively large length whose axis A extends horizontally approximately in the radial longitudinal center plane M indicated in FIG. 1 at a right angle to the axis of the brake disc 5 which is not visible. By means of this bearing lug 40, the brake caliper unit is to be rotatably about the axis A, linked to a part which is fixed to the vehicle and is not shown, particularly the vehicle frame or bogie frame. The brake caliper unit can then absorb without any force particularly large rotating movements of the brake disc 5 about an axis of rotation extending in the longitudinal direction of the vehicle, as may occur when the brake disc 5 is disposed, on the one side, on a drive and, on the other side, on a hollow shaft of a hollow-shaft drive of the vehicle coupled to a wheel set. In the case of this suspension of the brake caliper unit which can be rotated about the axis A, it is expedient to equip this brake caliper unit by an arrangement of some or several of its parts which is correspondingly laterally offset toward one of the caliper levers, particularly the brake power unit, the slack adjusting device and/or the operating linkage 21, optionally together with the operating device 7, with an indifferent rotary equilibrium about the axis A. It is illustrated in FIG. 1 that, for the balancing of the weight of the eccentric transmission 11, the operating device 7, together with the operating linkage 21, is arranged to be laterally offset out of the longitudinal center plane M toward the caliper lever 2 situated opposite the eccentric transmission 11.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. A brake caliper unit for disc brakes of vehicles comprising:

two caliper levers extending approximately in parallel side-by-side;

brake pads linked to one end of the caliper levers and can be pressed against a brake disc;

central regions of the caliper levers swivellably coupled to a housing;

a slack adjusting device swivellably linked to other, opposite ends of the caliper levers;

a brake cylinder mounted to the housing to lie between the central regions of the caliper levers;

at least one eccentric transmission coupling the brake cylinder to the central region of one of the caliper levers; and the eccentric transmission including a crank arm driven by the brake cylinder and a shaft and an eccentric pin combination rotatably disposed on the housing and coupling the crank arm and the one caliper lever.

2. A brake caliper unit according to claim 1 wherein the caliper levers are situated horizontally side-by-side, the housing has on its top side a bearing lug with a horizontal axis which extends approximately in a radial center plane of the brake disc at a right angle to the brake disc axis, and the bearing lug is adapted to be connected to the vehicle.

3. A brake caliper unit according to claim 2, wherein for achieving an indifferent rotary equilibrium about the horizontal axis, the brake caliper unit has a suitable mass and component arrangement, particularly by the arrangement of the brake cylinder, the slack adjusting device and associated operating linkage which is correspondingly offset laterally toward one of the caliper levers.

4. A brake caliper unit according to claim 3, wherein for achieving the indifferent rotary equilibrium about the horizontal axis, the operating linkage of the slack adjusting device is arranged to be laterally offset toward the caliper lever situated opposite the eccentric transmission.

5. A brake caliper unit according to claim 1, wherein the brake cylinder is held between the two caliper levers with an axis approximately parallel to a longitudinal axis of the caliper levers and is coupled with the eccentric transmission by a crank arm extending approximately transversely to the longitudinal axis of the caliper levers.

6. A brake caliper unit according to claim 1 wherein the slack adjusting device can be operated by an operating linkage which extends from the slack adjusting device to a part which can be moved by the brake cylinder.

7. A brake caliper unit according to claim 1, for achieving a symmetrical spacing between the brake pads and the brake disc comprising a bearing point to the slack adjusting device of the caliper lever disposed by the eccentric transmission on the housing having a sluggish operation, particularly a frictional engagement between the caliper lever and the slack adjusting device.

8. A brake caliper unit according to claim 11, wherein for achieving an indifferent rotary equilibrium about the horizontal axis, an operating linkage of the slack adjusting device is arranged to be laterally offset toward the caliper lever situated opposite the eccentric transmission.

9. A brake caliper unit according to claim 1, wherein the pin is screwed into the shaft.

10. A brake caliper unit according to claim 1, wherein the pin is a cylindrical section of a screw screwed into the shaft.

11. A brake caliper unit according to claim 1, wherein the shaft is rotatably disposed on the housing.

12. A brake caliper unit for disc brakes of vehicles comprising:

two caliper levers extending approximately in parallel side-by-side;

brake pads linked to one end of the caliper levers and can be pressed against a brake disc;

central regions of the caliper levers swivellably coupled to a housing;

a slack adjusting device swivellably linked to other, opposite ends of the caliper levers;

a brake cylinder mounted to the housing to lie between the central regions of the caliper levers;

at least one eccentric transmission coupling the brake cylinder to the central region of one of the caliper levers;

the one caliper lever including two cheeks; and the eccentric transmission including a shaft rotatably disposed on the housing, a crank arm driven by the brake cylinder non-rotatably connected with a central region of the shaft and an eccentric pin on each end of the shaft rotatably disposed in the cheeks.

13. A brake caliper unit according to claim 12, wherein the pins are screwed into the shaft.

14. A brake caliper unit according to claim 12, wherein said pin is a cylindrical section of a screw screwed into the shaft.

\* \* \* \* \*